US006242884B1

(12) United States Patent
Lipo et al.

(10) Patent No.: US 6,242,884 B1
(45) Date of Patent: Jun. 5, 2001

(54) DUAL STATOR WINDING INDUCTION MACHINE DRIVE

(75) Inventors: Thomas A. Lipo, Middleton; Alfredo Rodolfo Muñoz-Garcia, Madison, both of WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/274,164

(22) Filed: Mar. 22, 1999

Related U.S. Application Data
(60) Provisional application No. 60/079,140, filed on Mar. 24, 1998.

(51) Int. Cl.[7] .................................................. H02P 5/28

(52) U.S. Cl. ...................... 318/808; 318/801; 318/807; 318/524; 318/496; 318/503; 318/727

(58) Field of Search ................................ 318/808, 801, 318/807, 524, 496, 503, 727; 310/180

(56) References Cited

U.S. PATENT DOCUMENTS

| 3,584,278 | 6/1971 | Krabbe et al. . | |
|---|---|---|---|
| 4,039,910 | * 8/1977 | Chirgwin | 318/808 |
| 4,503,377 | 3/1985 | Kitabayashi et al. . | |
| 4,562,397 | 12/1985 | Kitabayashi et al. . | |
| 4,999,561 | 3/1991 | Kaga et al. . | |
| 5,130,591 | 7/1992 | Sato . | |
| 5,777,459 | 7/1998 | Bansal et al. . | |
| 5,888,550 | 3/1999 | Fukao et al. . | |

OTHER PUBLICATIONS

P.L. Alger, et al., "Double Windings for Turbine Alternators," AIEE Transactions, vol. 49, Jan. 1930, pp. 226–244.
P.W. Franklin, "A Theoretical Study of the Three Phase Salient Pole Type Generator with Simultaneous AC and Bridge Rectified DC Output," IEEE Transactions on Power App. and Systems, vol. PAS–92, No. 2, Mar./Apr. 1973, pp. 543–557.
J.R. Fu, et al., "Disturbance–Free Operation of a Multiphase Current–Regulated Motor Drive with an Opened Phase," IEEE Transactions on Industry Appllctions, vol. 30, No. 5, Sep./Oct. 1994, pp. 1267–1274.

(List continued on next page.)

Primary Examiner—Karen Masih
(74) Attorney, Agent, or Firm—Foley & Lardner

(57) ABSTRACT

A dual stator winding induction machine has two windings with input terminals which are supplied separately with drive power. The two stator windings have a different number of poles to essentially eliminate the magnetic coupling between the two windings and to decouple the torques produced by each set of windings. Power is supplied to the two windings by two separate variable frequency inverter drives to provide two independently controllably torque components. At low speed, the power supplied to one of the windings can produce torque which opposes the torque from the power applied to the other winding, so that very low speed and standstill operation can be achieved while the frequency of the power supplied by the inverters is always greater than the minimum frequency. At higher operating speeds, power is supplied to the two windings so that the torque from the windings adds. The dual stator machine can be built with minimal modifications to standard winding configurations.

12 Claims, 13 Drawing Sheets

OTHER PUBLICATIONS

J.C. Salmon, et al., "A Split–Wound Induction Motor Design to Improve the Reliability of PWM Inverter Drives," IEEE Transactions on Industry Applications, vol. IA–26, No. 1, Jan./Feb. 1990, pp. 143–150.

E.F. Fuchs, et al., "Analysis of an Alternator with Two Displaced Stator Windings," IEEE Transactions on Power App. and Systems, vol. PAS–93, No. 6, Nov./Dec. 1974, pp. 1776–1786.

T.A. Lipo, "A d–q Model for Six Phase Induction Machines," International Conference on Electric Machines, Athens, Greece, 1980, pp. 860–867.

T.J. Jahns, "Improved Reliability in Solid–State AC Drives by Means of Multiple Independent Phase–Drive Units," IEEE Transactions on Industry Applications, vol. IA–16, No. 3, May/Jun. 1980, pp. 321–331.

\* cited by examiner

DUAL STATOR WINDING INDUCTION MACHINE DRIVE

CROSS REFERENCE TO RELATED APPLICATION

This application claims the benefit of provisional patent application No. 60/079,140, filed Mar. 24, 1998.

This invention was made with United States Government support awarded by the following agencies: NSF Grant No.: 9510115. The United States Government has certain rights in this invention.

FIELD OF THE INVENTION

This invention pertains generally to the field of electric motors and to drives for such motors, and particularly to induction machine drives.

BACKGROUND OF THE INVENTION

The use of a common magnetic structure which is shared by two sets of stator windings was first introduced in the late 1920s as a way to increase the power capability of large synchronous generators. See, P. L. Alger, et al., "Double Windings for Turbine Alternators," AIEE Transactions, Vol. 49, January, 1930, pp. 226–244. Since that time, dual stator machines have been used in many other applications. These include synchronous machines with AC and DC outputs. P. W. Franklin, "A Theoretical Study of the Three-Phase Salient Pole-Type Generator with Simultaneous AC and Bridge Rectified DC Output," IEEE Transactions on Power App. and Systems, Vol. PAS-92, No. 2, March/April 1973, pp. 543–557. Dual stator machines have also been used as current source inverters to large pumps, compressors and rolling mills driven by induction machines. T. Kataoka, et al., "Dynamic Control of a Current-Source Inverter/Double-Wound Synchronous Machine System for AC Power Supply," IEEE Transactions on Industry Applications, Vol. IA-17, No. , 3May/June 1981, pp. 314–320. Another purpose for the use of dual stators has been to improve reliability at the system level. See, e.g., J. R. Fu, et al., "Disturbance Free Operation of a Multiphase Current Regulated Motor Drive with an Open Phase," IEEE Transactions on Industry Applications, Vol. 30, No. 5, September/October 1994, pp. 1267–1274; J. C. Sahnon, et al., "A Split-Wound Induction Motor Design to Improve the Reliability of PWM Inverter Drives, " IEEE Transactions on Industry Applications, Vol. IA-26, No. 1, January/February 1990, pp. 143–150.

Dual stator machines are normally constructed by "splitting " the stator winding into two displaced but identical windings. See, e.g., E. F. Fuchs, et al., "Analysis of an Alternator with Two Displaced Stator Windings, " IEEE Transactions on Power App. and Systems, Vol. PAS-93, No. 6, November/December 1974, pp. 1776–1786. However, splitting the stator winding in this manner results in mutual coupling between the stators, causing circulating harmonic currents. K. Gopakumar, et al., "Split-Phase Induction Motor Operation from PWM Voltage Source Inverter, " IEEE Transactions on Industry Applications, Vol. 29, No. 5, September/October 1993, pp. 927–932. Such split stator winding machines have thus had a major drawback because the circulating currents add extra stator losses and demand larger semiconductor device ratings. In addition, there is coupling between the electromagnetic torques produced by each stator winding. See, T. A. Lipo, "A d-q Model for Six Phase Induction Machines, " International Conference on Electric Machines, Athens, Greece, 1980, pp. 860–867.

SUMMARY OF THE INVENTION

A dual stator winding induction machine in accordance with the invention has two polyphase windings with input terminals available to be supplied separately with drive power. The two stator windings are wound with a different number of poles to essentially eliminate the magnetic coupling between the two stator windings and to decouple the torques produced by each set of stator windings. In addition, circulating harmonic currents encountered in conventional dual stator winding machines due to the so called mutual leakage coupling are completely eliminated. Since the output torque corresponds to the algebraic sum of two independent torques, the stator frequency is no longer determined uniquely by the rotor speed and the slip frequency, but also by the added variable of a second torque component, adding an additional degree of freedom to the system for greater control flexibility.

The dual stator winding machine supplied with power from two separate variable frequency inverter drives in accordance with the invention provides two independently controllable torque components, thereby allowing the low frequency operation of the machine —including at standstill —to be improved. Such a characteristic is particularly important for constant volts per hertz control operation at zero speed, where the influence of the stator resistance becomes dominant. In the present invention, zero speed operation does not require zero excitation frequency for the two power drives, thus significantly reducing the effect of the resistance voltage drop. The dual stator machine of the present invention can be built with minimal modifications to standard winding configurations, requiring no structural modifications of the stator frame. The provision of the two stator windings also increases the reliability of the machine over standard single stator winding machines, while improving the magnetic material utilization for normal operation.

A particular advantage of the present invention is the ability to drive the machine at zero and low speed operation without the need for a rotor position encoder to provide rotor position and speed feedback. Zero speed operation can be obtained by applying drive power to the two windings at a frequency and power level to provide opposing, balanced torques to the rotor. Implementation of sensorless vector control is thus facilitated since the drive power supplied to the two stator windings is always above zero frequency.

The stator of the machine of the present invention is constructed by dividing the normal single polyphase (typically three-phase) winding into two separate (e.g., three-phase) windings wound for a dissimilar number of poles. Although any combination of dissimilar pole numbers may be used, to best utilize the magnetic material, and avoid localized saturation and additional stator losses, in accordance with the invention it is preferred that a 2 pole and 6 pole combination be utilized. For best magnetic material utilization, this pole number configuration provides a nearly trapezoidal magnetomotive force (MMF) distribution while limiting the maximum number of poles to provide good power factor and efficiency.

Further objects, features and advantages of the invention will be apparent from the following detailed description when taken in conjunction with the accompanying drawings.

DETAILED DESCRIPTION OF THE INVENTION

Figure 1:
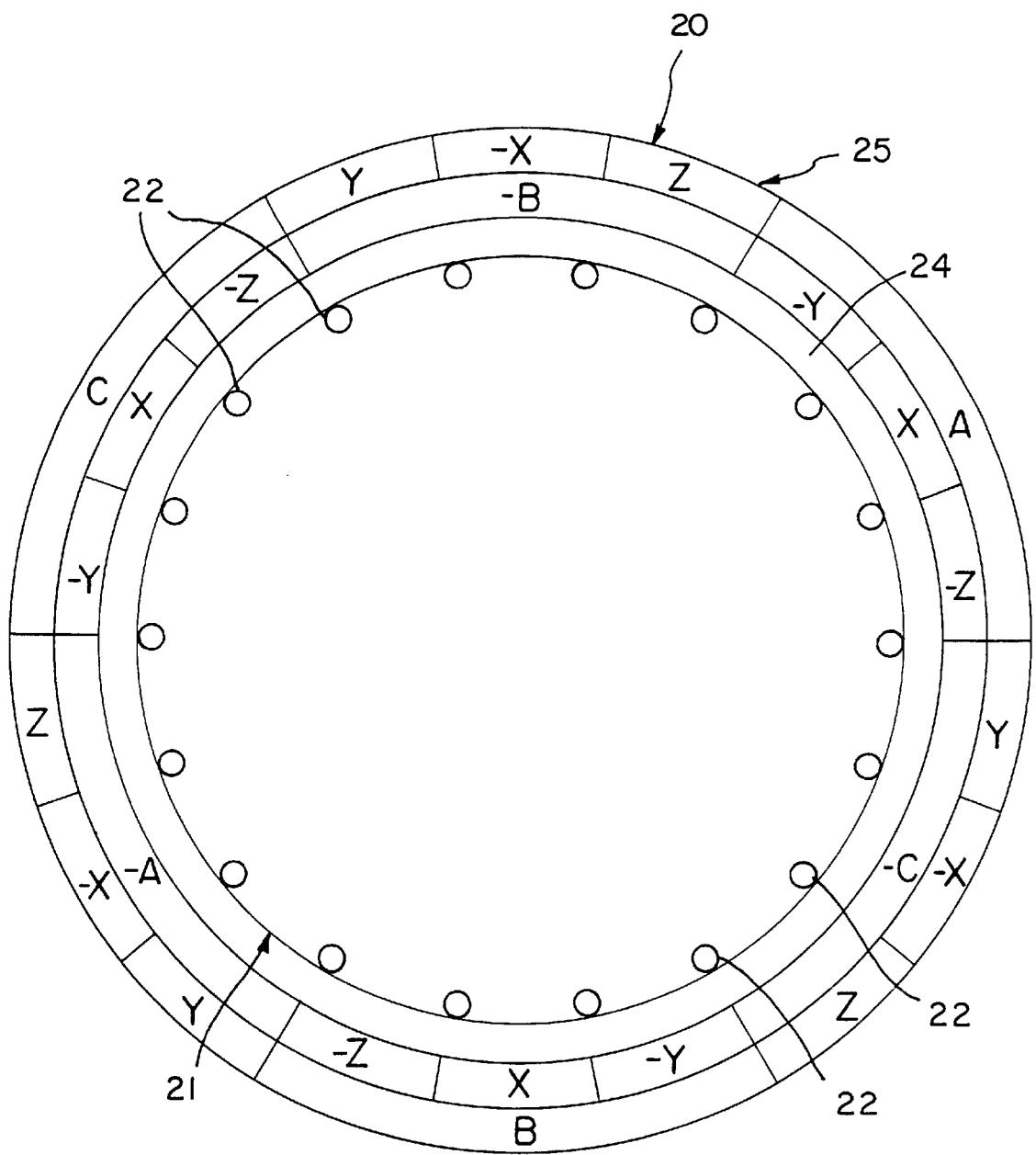
FIG. 1 is a schematic diagram showing the dual stator winding distributions in the machine of the present invention.

The stator of the machine of the invention is constructed by dividing the normal polyphase (e.g., three phase) stator winding into two separate polyphase windings wound for a dissimilar number of poles. Three phase motors are by far the most common type, but it is understood that the present invention may be utilized with machines having two or more phases. Any combination of dissimilar pole number could be used; however, to best utilize the magnetic material, avoid localized saturation and additional stator losses, it is found that the most advantageous configuration is a 2–6 pole combination. Such an arrangement is incorporated in the machine shown generally at 20 in FIG. 1. The machine 20 in accordance with the invention has a squirrel cage rotor 21 with rotor bar conductors 22 around its periphery in a conventional manner, and is separated by an air gap 24 from the stator 25. The rotor is mounted for rotation within the stator in a conventional manner. FIG. 1 illustrates the physical arrangement of the dual stator windings, a first, two-pole winding abc and a second, six-pole winding xyz. For simplicity of illustration, the metal frame and magnetic material of the stator, which is entirely conventional, is not shown in FIG. 1. Each of the windings abc and xyz extend to three external terminals (not shown in FIG. 1) by which power is supplied independently to each of the two windings.

From the perspective of magnetic material utilization it is convenient to choose a pole number combination that, in the steady state, will tend to produce a nearly trapezoidal MMF distribution. This type of distribution is most efficiently obtained by choosing the number of poles in the ratio 1:3, for example, 2 and 6 poles, 4 and 12 poles, etc. On the other hand, the magnetizing inductance varies inversely proportional to the square of the number of poles, hence a machine with a large number of poles results in low power factor and reduced efficiency. In addition, to achieve a sinusoidal winding distribution the stator winding must be distributed among several slots, and, for a given stator inner diameter, the number of slots per pole decreases in proportion to the number of poles. Also, for a given rotor speed, the stator frequency increases directly proportional to the number of poles. This translates into additional losses, in the machine and in the power converter, further reducing the efficiency. All these factors suggest that the maximum number of poles should be kept to a minimum, and hence the best combination is 2 and 6 poles. However, other pole combinations may be used and are within the scope of the invention.

The total MMF distribution in the airgap corresponds to the sum of the MMF's produced by each stator winding. To avoid the presence of highly saturated points and, at the same time, fully utilize the magnetic core it is desirable to maintain the total peak flux density distribution equal to that created by a two pole winding acting alone.

Figure 2:
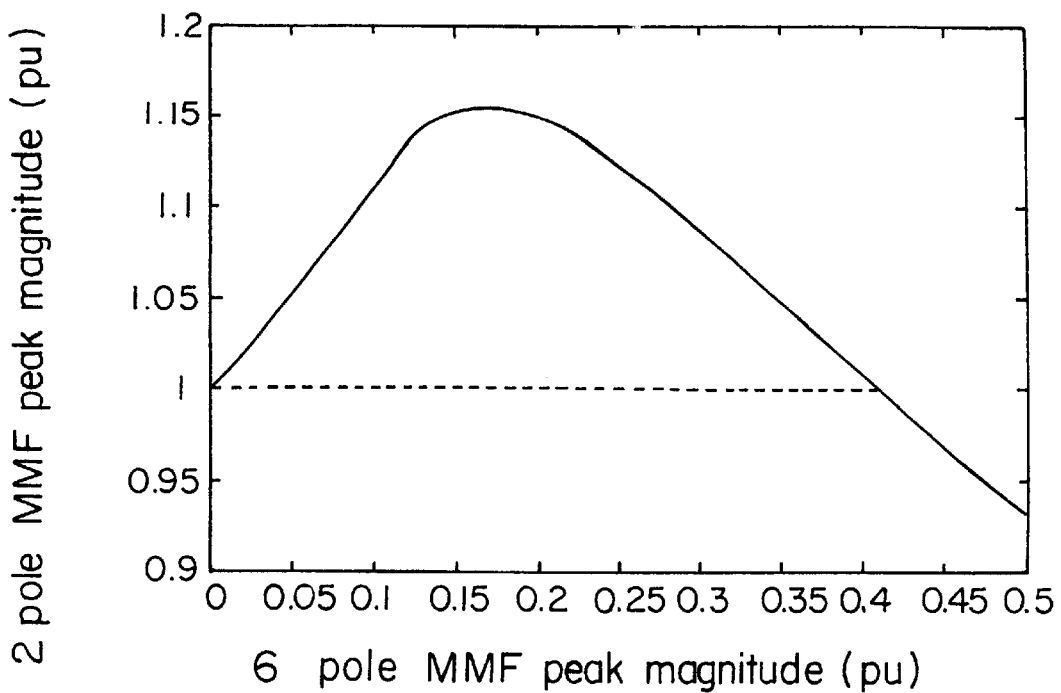
FIG. 2 is a graph illustrating the 6 pole peak MMF for constant total peak MMF.

FIG. 2 shows the peak magnitude of the 2 pole MMF as a function of the 6 pole peak MMF, for a constant total peak MMF. The optimum distribution corresponds to choosing a 6 pole MMF equal to approximately 40% that of the 2 pole distribution. In this case the total MMF and the 2 pole MMF have the same peak amplitude, thus preserving the saturation level.

The rotor 21 of the machine 20 preferably corresponds to that of a standard squirrel cage type. This construction guarantees that both stator current distributions will simultaneously couple with the rotor flux to produce the desired torque.

Figure 3:
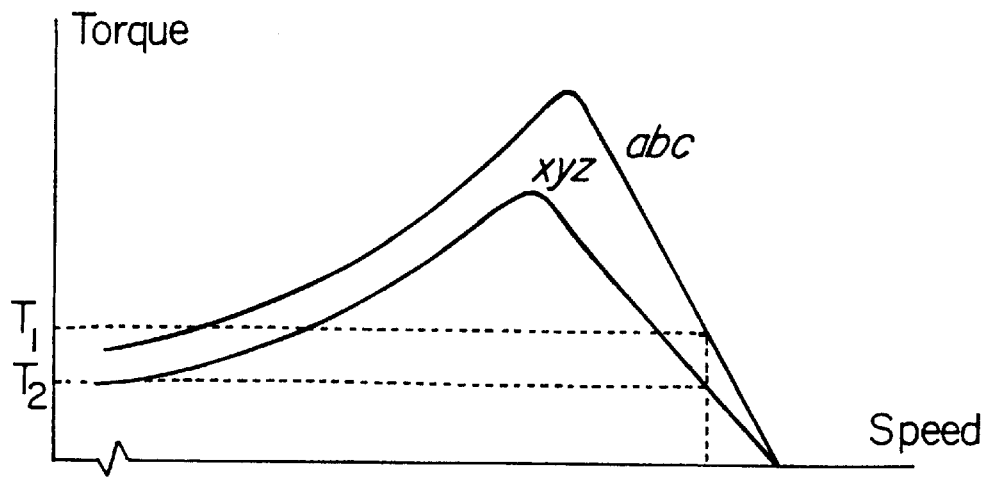
FIG. 3 is a graph showing speed-torque curves for the two stator windings in a first mode of operation where the torques are added.
Figure 4:
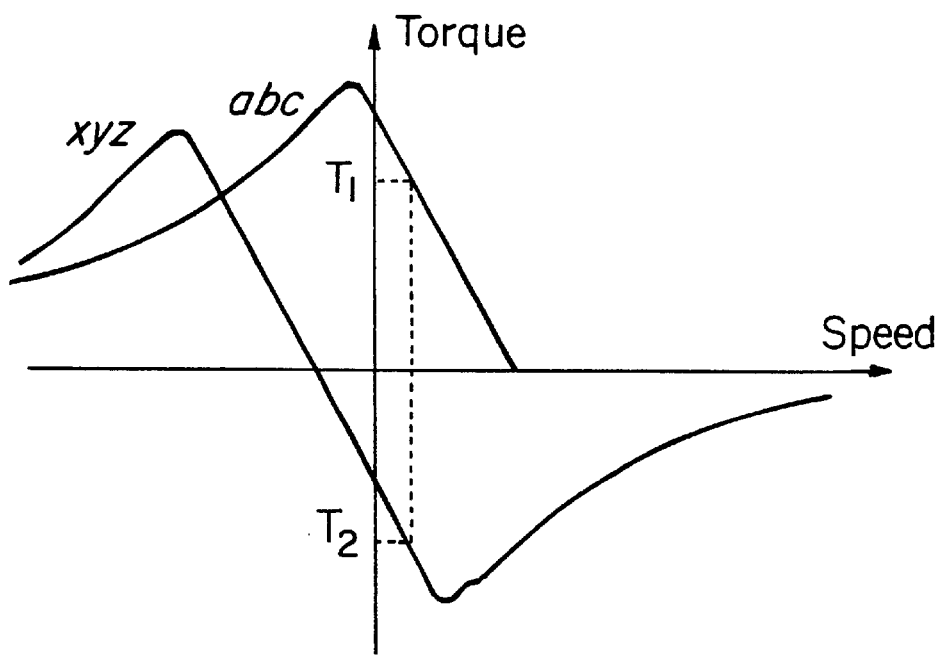
FIG. 4 is a graph showing speed-torque curves for the two stator windings for low speed operation where the two torques applied by the two stator windings oppose each other.

Because of the decoupling effect produced by the difference in pole number, the dual stator machine 20 behaves as two independent induction machines that are mechanically coupled through the rotor shaft. Therefore, all the known control techniques used in induction machine drives are also applicable to the dual stator winding machine. These include both scalar constant volts per hertz (V/f) control and vector control or field orientation (FO). The basic control method involves generating two torque commands that, when combined, produce the required output torque. By choosing adequate current commands the two individual torques can be added or subtracted, hence providing the ability to control the excitation frequency. Two distinct modes of operation are possible: low speed (below a selected minimum speed) where the two torques produced by the abc and xyz windings are subtracted (opposed to one another), as shown in FIG. 4, and medium to high speed (above the minimum speed), where the torques are added, as shown in FIG. 3.

Figure 5:
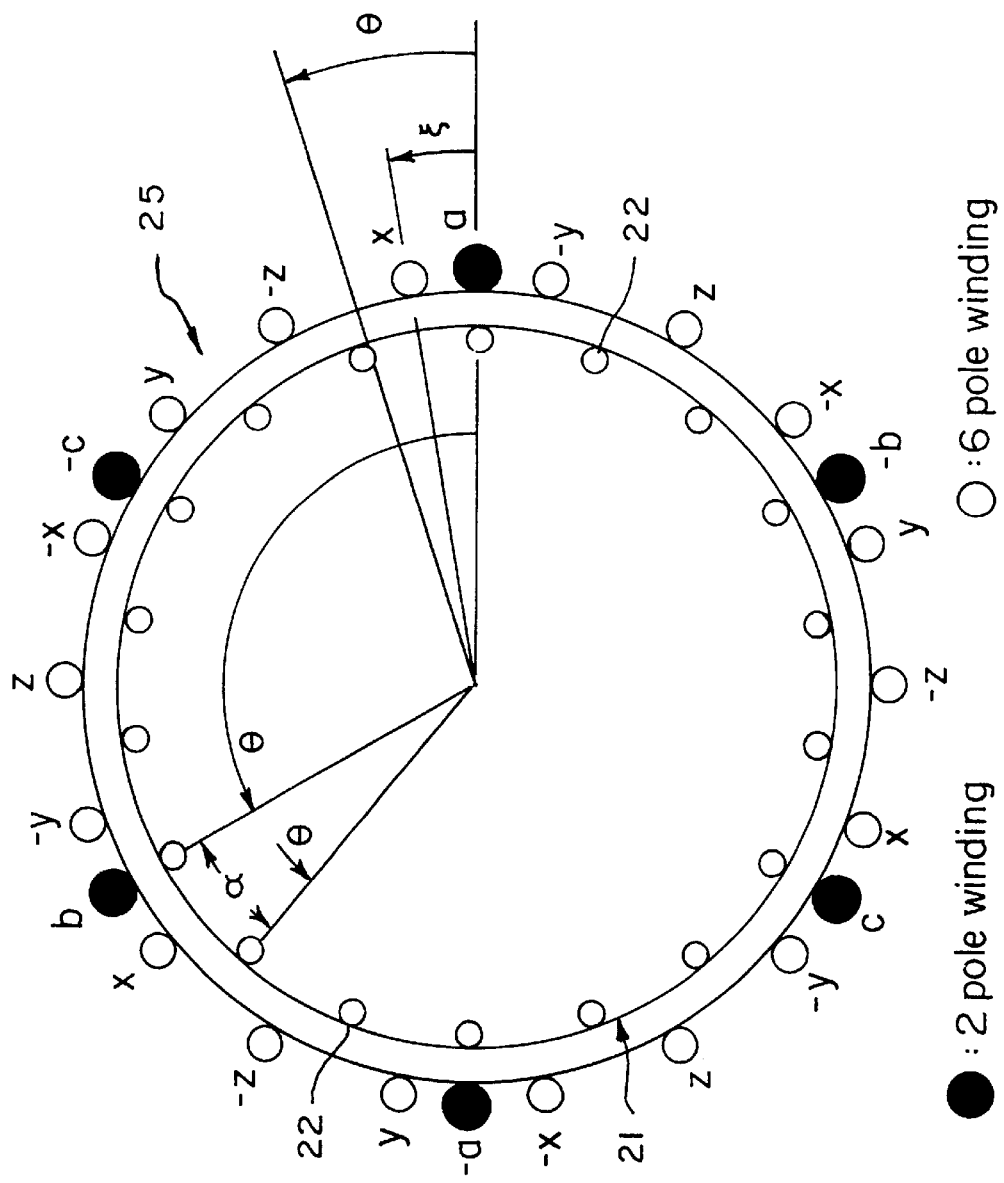
FIG. 5 is another illustrative view of a 2 pole-6 pole dual stator winding induction machine in accordance with the invention.

A detailed, yet simple, dynamic model of the machine can be developed using the following general assumptions: negligible saturation, uniform airgap, stator windings sinusoidally distributed, no electrical interconnection between stators, and negligible inter-bar current. It is also assumed that the two stator windings are wound for 2 and 6 poles, respectively, and that one stator is displaced with respect to the other by a fixed but arbitrary angle ξ. The main stator (2 pole) is denoted as the abc windings and the secondary stator, having 6 poles, the xyz windings, as illustrated in FIG. 1. The rotor of the machine is a standard squirrel cage type. A simplified diagram showing the relative placement of the windings and their angular relationships is given in FIG. 5.

Since both stators are sinusoidally distributed in space but wound for a different number of poles (and are electrically isolated) there is no mutual coupling due to main flux between them. However, since both windings share common slots and are in close proximity, there is a common leakage flux linking them. This gives rise to the so-called mutual leakage coupling.

The total flux linked by the stator windings and due only to the stator currents is abc and is xyz can be written, in matrix form as $$\begin{bmatrix} \Lambda_{ssabc} \\ \Lambda_{ssxyz} \end{bmatrix} = \begin{bmatrix} L_{s1} & L_{s12} \\ L_{s21} & L_{s2} \end{bmatrix} \begin{bmatrix} i_{sabc} \\ i_{sxyz} \end{bmatrix} \text{where} \tag{1}$$

$$\begin{bmatrix} \Lambda_{ssabc} \\ \Lambda_{ssxyz} \end{bmatrix} = \begin{bmatrix} \lambda_{ass} \\ \lambda_{bss} \\ \lambda_{css} \\ \lambda_{xss} \\ \lambda_{yss} \\ \lambda_{zss} \end{bmatrix}; \begin{bmatrix} i_{sabc} \\ i_{sxyz} \end{bmatrix} = \begin{bmatrix} i_{as} \\ i_{bs} \\ i_{cs} \\ i_{xs} \\ i_{ys} \\ i_{zs} \end{bmatrix} \tag{2}$$

$L_{s1}$ and $L_{s2}$ represent the self inductance matrices of the abc and xyz windings, respectively. They are of the form:

$$L_{si} = \begin{bmatrix} L_{lsi} + L_{msi} & -\frac{L_{msi}}{2} & -\frac{L_{msi}}{2} \\ -\frac{L_{msi}}{2} & L_{lsi} + L_{msi} & -\frac{L_{msi}}{2} \\ -\frac{L_{msi}}{2} & -\frac{L_{msi}}{2} & L_{lsi} + L_{msi} \end{bmatrix} \tag{3}$$

The magnetizing inductance $L_{msi}$ is known to be:

$$L_{msi} = \frac{\pi \mu_0 l \tau}{g} \left( \frac{N_{si}}{P} \right)^2 \tag{4}$$

Where $N_{si}$ is the total number of turns per phase of each winding set and P is the number of poles. $L_{lsi}$ represents the total per-phase self leakage inductance of each winding and it can be calculated by traditional methods.

The sub-matrices $L_{s12}$ and $L_{s21}$ account for the mutual leakage coupling between the two stator windings. In general, the leakage flux can be divided into slot, end winding, belt and zig-zag components and each one of them will contribute to the self and mutual leakage inductance. For simplicity, however, the mutual leakage due to the zig-zag and belt leakage components will be neglected and it will be assumed that they only contribute to the self leakage. Therefore, it will be assumed that only the slot and end winding components contribute to the mutual leakage. Furthermore it will be assumed that the end winding leakage varies as the slot leakage.

Figures 6, 7:
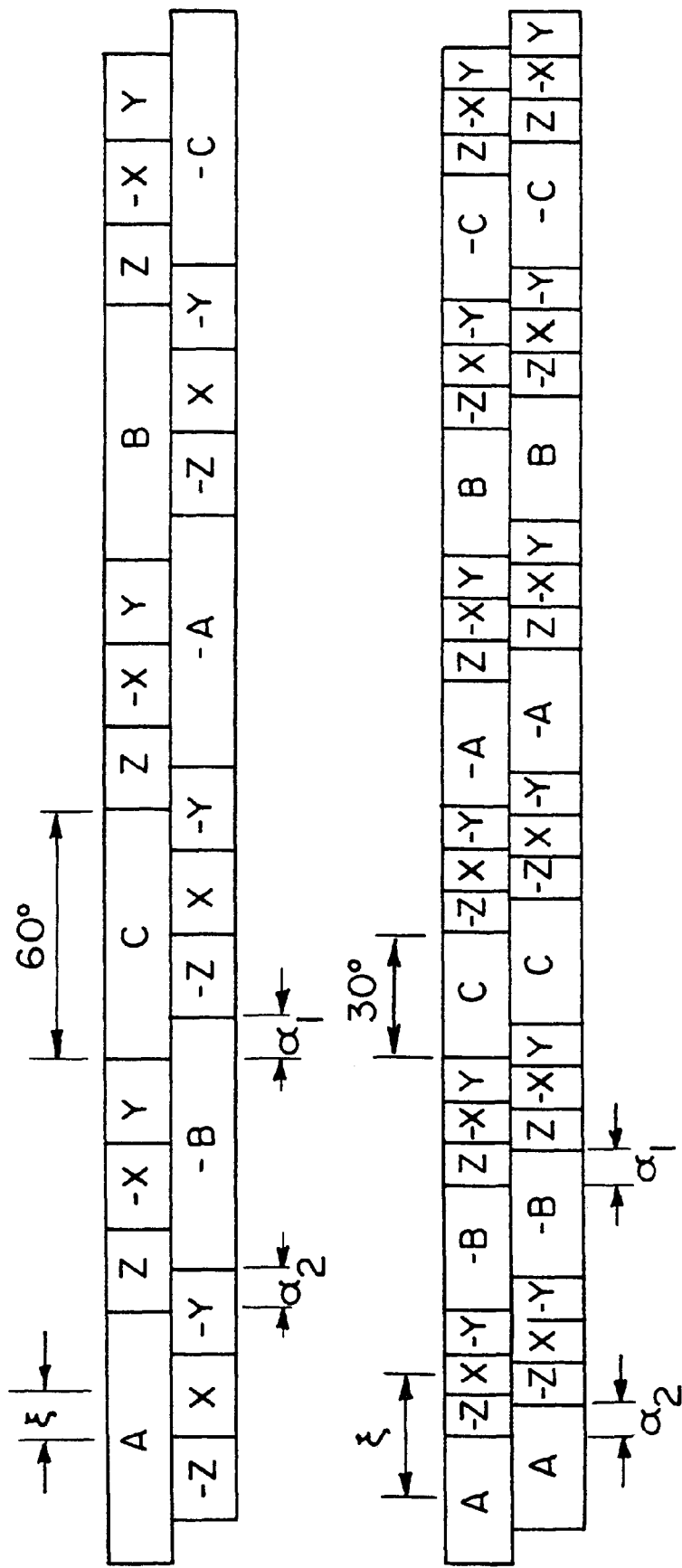
FIG. 6 is a diagram illustrating the winding distribution in the dual stator winding machine for a fractional pitch and variable displacement angle , with a 60° phase belt.
FIG. 7 is a diagram as in FIG. 6 illustrating the winding distribution for a fractional pitch and variable displacement angle ξ with a 30° phase belt.

The winding distributions of FIGS. 6 and 7 may be used to study the mutual leakage. The illustrative winding distribution shown in FIG. 6 corresponds to fractional pitch due to the displacement ξ between stators, 60% phase belt, and in the distributions FIG. 7 corresponds to fractional pitch, 30% phase belt. Since the two sets of windings have 2 and 6 poles respectively, their pitch angles $\alpha_1$ and $\alpha_2$ are in the ratio 6/2. In FIG. 6, defining $p_1$ and $p_2$ as the pitch of the abc and xyz windings respectively, for a variation of ξ between zero and 20°, the corresponding pitch factors vary as 8/9<$p_1$<1 and 2/3<$p_2$<1.

The slot leakage can be divided into self leakage and mutual leakage. The self leakage represents that part of the flux produced by the in-phase current component (i.e., slots with coil sides belonging to the same phase). The mutual leakage accounts for the leakage flux due to having conductors from different phases sharing common slots. In general, for a two layer winding self, ($L_{sls}$), and mutual, ($L_{slm}$), components of the slot leakage inductance can be expressed, as a function of the pitch p, by $$L_{sls} = L_{IT} + L_{IB} + ^2 k_s(p) L_{ITB} \tag{5}$$

$$L_{slm} = k_m(p) L_{ITB} \tag{6}$$

where $L_{IT}$ and $L_{IB}$ are the slot leakage inductances associated to the coils in the top and bottom halves of the slots. They are calculated for the case of unity pitch and do not depend on winding pitch. The term $L_{ITB}$ represents the mutual inductance between coils in the top and bottom halves of the slot. The quantities $k_s$ and $k_m$ are called slot factors and they correspond to proportionality constants that depend on the pitch.

For the dual stator machine of the invention, it can be demonstrated that both stator windings are fully decoupled and the total flux linked by the stator windings can be written as $$\Lambda_{sabc} = L_{s1} i_{sabc} + L_{sr1} i_r \tag{7}$$

for the primary winding and $$\Lambda_{sxyz} = L_{s2} i_{sxyz} + L_{sr2} i_r \tag{8}$$

for the secondary winding. The matrices $L_{sr1}$ and $L_{sr2}$ describe the mutual coupling between the stator and rotor circuits and they can be determined using winding functions. Using complex vector representation, the stator flux associated to the abc winding can be written as $$\underline{\lambda}_{sabc} = \left( L_{ls1} + \frac{3}{2} L_{ms1} \right) \underline{i}_{s1} + \frac{2n \sin \delta}{\pi N_{s1}} L_{ms1} e^{j(\theta_r + \delta)} \underline{i}_{r1} \tag{9}$$

where n is the number of rotor bars, δ is ½ the angle between rotor bars, and the complex vector currents $\underline{i}_{s1}$ and $\underline{i}_{r1}$ are defined by $$\underline{i}_{s1} = \frac{2}{3}(i_{as} + a i_{bs} + a^2 i_{cs}) \tag{10}$$

-continued $$i_{rl} = \frac{2}{n}[1\underline{b}, \underline{b}^2, \ldots \underline{b}^{n-1}]\begin{bmatrix} i_{r1} \\ i_{r2} \\ \vdots \\ i_m \end{bmatrix} \quad (11)$$

Figure 8:
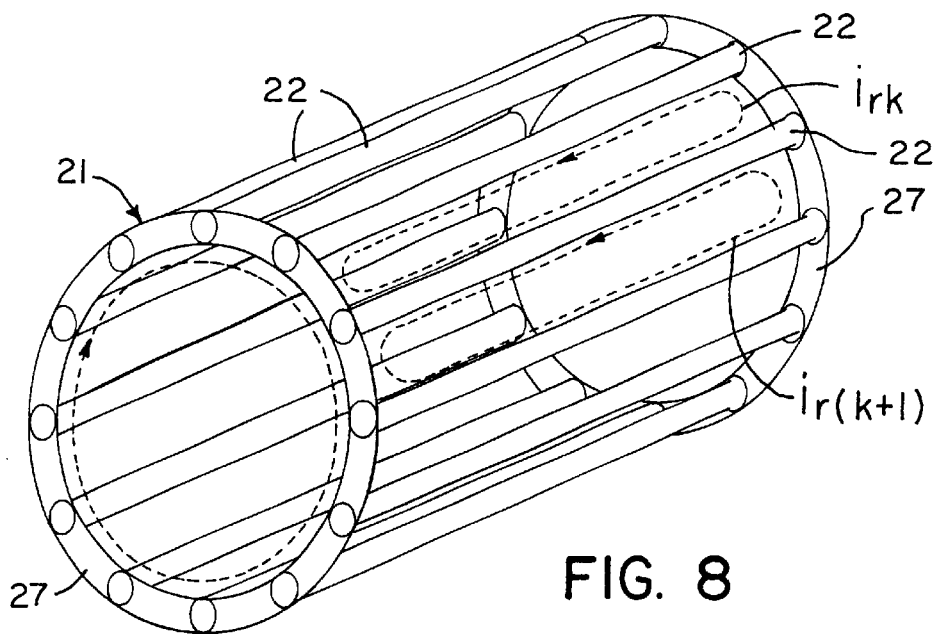
FIG. 8 is an illustrative view of a squirrel cage rotor for use on an induction machine of the present invention, illustrating the rotor currents.

With $\underline{a}=e^{j2\pi/3}$ and $\underline{b}=e^{j2\pi/n}$. The vector $[i_{r1}, i_{r2} \ldots i_m]^T$ represents the instantaneous rotor currents, defined according to FIG. 8, which illustrates the currents flowing in the rotor bars 22 and in the end rings 27 that connects the bars 22.

A similar analysis can be performed for the xyz winding.

It can further be demonstrated that the stator current $\underline{i}_{s1}$ depends only on the applied voltage $\underline{v}_{s1}$ and the rotor current $\underline{i}_{r1}$. Similarly, the stator current $\underline{i}_{s2}$ depends only on the applied voltage $\underline{V}_{s2}$ and the rotor current $\underline{i}_{r2}$. This result is consistent with the fact that, for a sinusoidally distributed winding, there only exists coupling between current distributions of the same number of poles.

Figure 9:
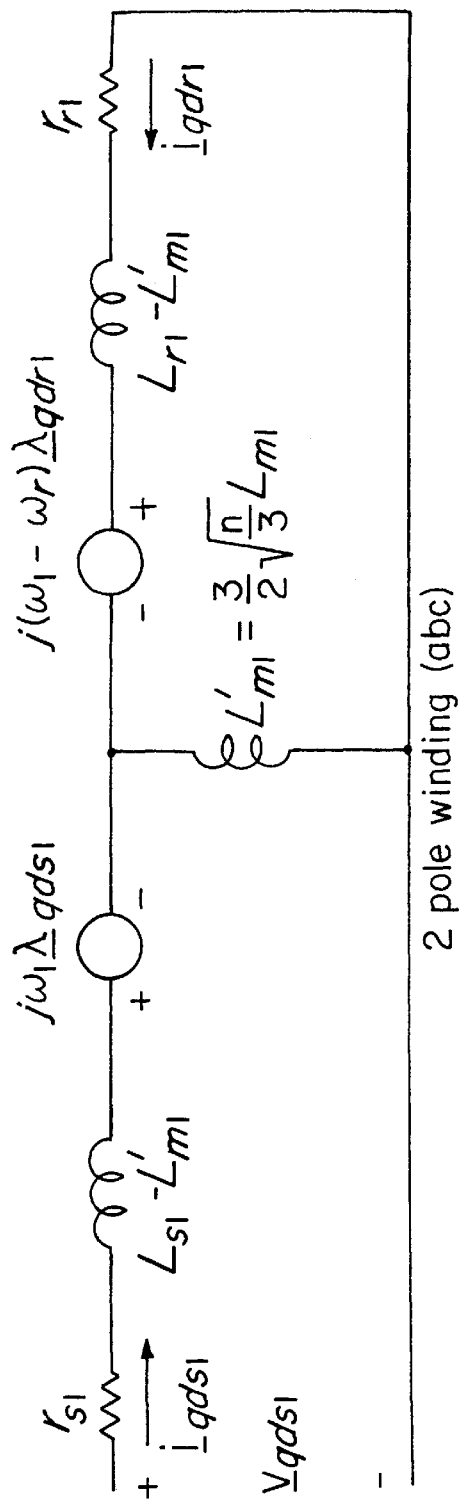
FIG. 9 is an equivalent circuit schematic diagram for the 2 pole winding of the dual stator winding machine of the invention.
Figure 10:
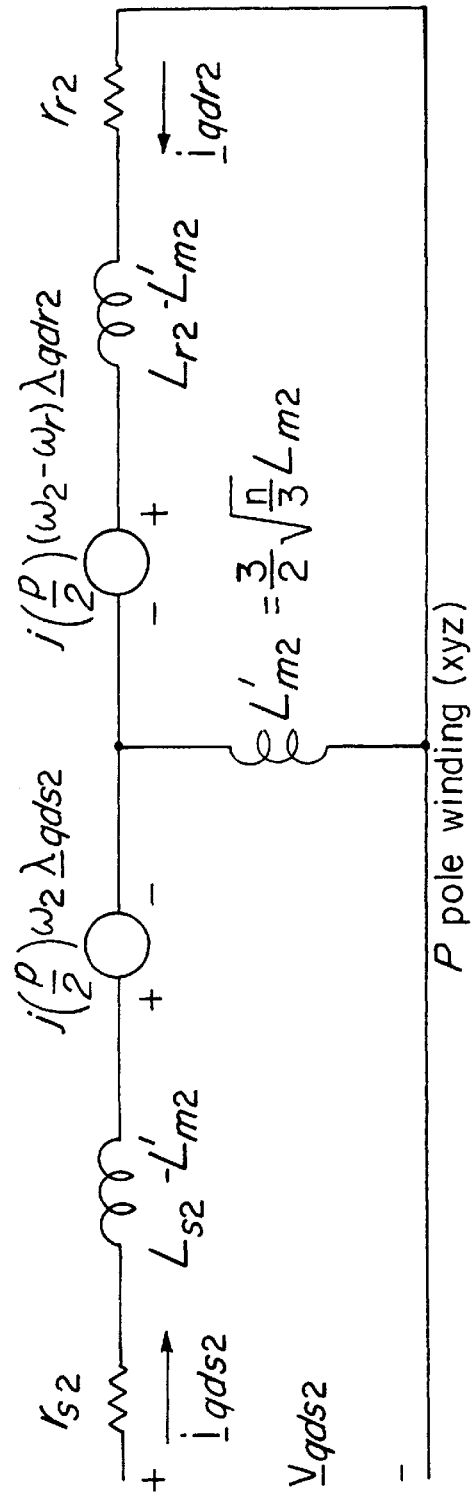
FIG. 10 is an equivalent circuit schematic diagram for a "P" pole winding for the dual stator machine of the invention.

Although the instantaneous rotor current distribution simultaneously contains two components of different frequencies and pole number, each stator field is capable of interacting only with that part of the rotor field with the "correct" number of poles. This is true not only on an average basis but also instantaneously. It is well known that sinusoidally distributed windings only couple with fields wound for the same number of poles; however, the rotor cage is clearly not a sinusoidal winding and one might expect that the presence of two superimposed flux distributions would give rise to pulsating torques. However, this is not the case for the dual stator winding machine. An equivalent circuit, using d-q notation, is shown in FIGS. 9 and 10 for the 2-pole and P-pole windings, respectively.

Neglecting saturation, the electromagnetic torque can be expressed as the partial variation of the co-energy with respect to position $$T_e = [i_{sabc}^T i_{sxyz}^T]\frac{\partial}{\partial \theta_r}\begin{bmatrix} L_{sr1} \\ L_{sr2} \end{bmatrix}i_r \quad (12)$$

which can be written as the separate sum of the torques produced by each set of stator currents $$T_e = i_{sabc}^T \frac{\partial L_{sr1}}{\partial \theta_r}i_r + i_{sxyz}^T \frac{\partial L_{sr2}}{\partial \theta_r}i_r$$

Substituting the corresponding matrices and carrying out the differentiation yields the torque as:

$$T_e = -\left(\frac{3n\sin\delta}{\pi N_{s1}}\right)L_{ms1}\text{Im}\left\{e^{j(\theta_r+\delta)}i_{s1}^*i_{r1} + e^{j3(\theta_r+\delta-\xi)}\frac{N_{s2}\sin(3\delta)}{3N_{s1}\sin\delta}i_{s2}^*i_{r2}\right\} \quad (14)$$

where P=6 is used. Since $\underline{i}_{r1}$ and $\underline{i}_{r2}$ are orthogonal vectors the two torque components can be controlled independently by the stator currents.

As noted above, because the machine of the invention behaves as two independent induction machines, mechanically coupled through the shaft, all the known control techniques used in induction machine drives are also applicable to the dual stator winding machine.

In general, there are two distinct modes of operation, the low speed range (i.e., frequencies below a minimum frequency, e.g., few hertz) and the medium to high speed range. In the low speed range, the goal is to maintain the frequency of the 2 pole winding above a minimum level (typically about 3 Hz) and the torque is controlled by adjusting the frequency of the 6 pole winding. By keeping the frequency above this pre-set limit, the influence of the stator resistance is minimized, hence simplfying the control. In this mode the two MMFs rotate asynchronously, but because of the reduced frequency the additional losses caused by saturation are minimal.

In the medium to high speed range, the negative effect of the stator resistance is not a concern and the frequencies are kept in the same ratio as the number of poles, e.g., ratio 1:3. This constraint guarantees a nearly trapezoidal flux distribution, and the torque is controlled by adjusting the magnitude of the applied voltages. The trapezoidal shape, in turn, allows for slightly greater 2 pole flux than when only the 2 pole winding is excited, thereby producing slightly more torque per ampere.

The operation and control may be explained with reference to FIGS. 3 and 4. For high speed, the stators are fed with voltages with frequencies in 1:3 ratio to produce the torque-speed curves of FIG. 3. The output torque for a given rotor speed corresponds to the algebraic sum of the torques $T_1$ and $T_2$ produced by each of the stator. The torque produced by each winding can be controlled by adjusting the magnitude of the stator voltages supplied to each winding.

When both stators are fed with different effective frequencies, the result is that shown in FIG. 4. By fixing the frequency $f_1$ of power supplied to one of the stator windings, say abc, the total output torque can be adjusted by controlling the frequency $f_2$ (and voltage) supplied to the xyz winding. As shown in FIG. 4, an increase in torque requires an increase in $f_2$, and vice versa. In this case, the first one of the stator windings (abc) operates in the motoring region while the other (xyz) operates as a generator. Note that this operating mode corresponds to the one required to operate at zero speed, and that the torque can be controlled from zero to rated value.

Figure 11:
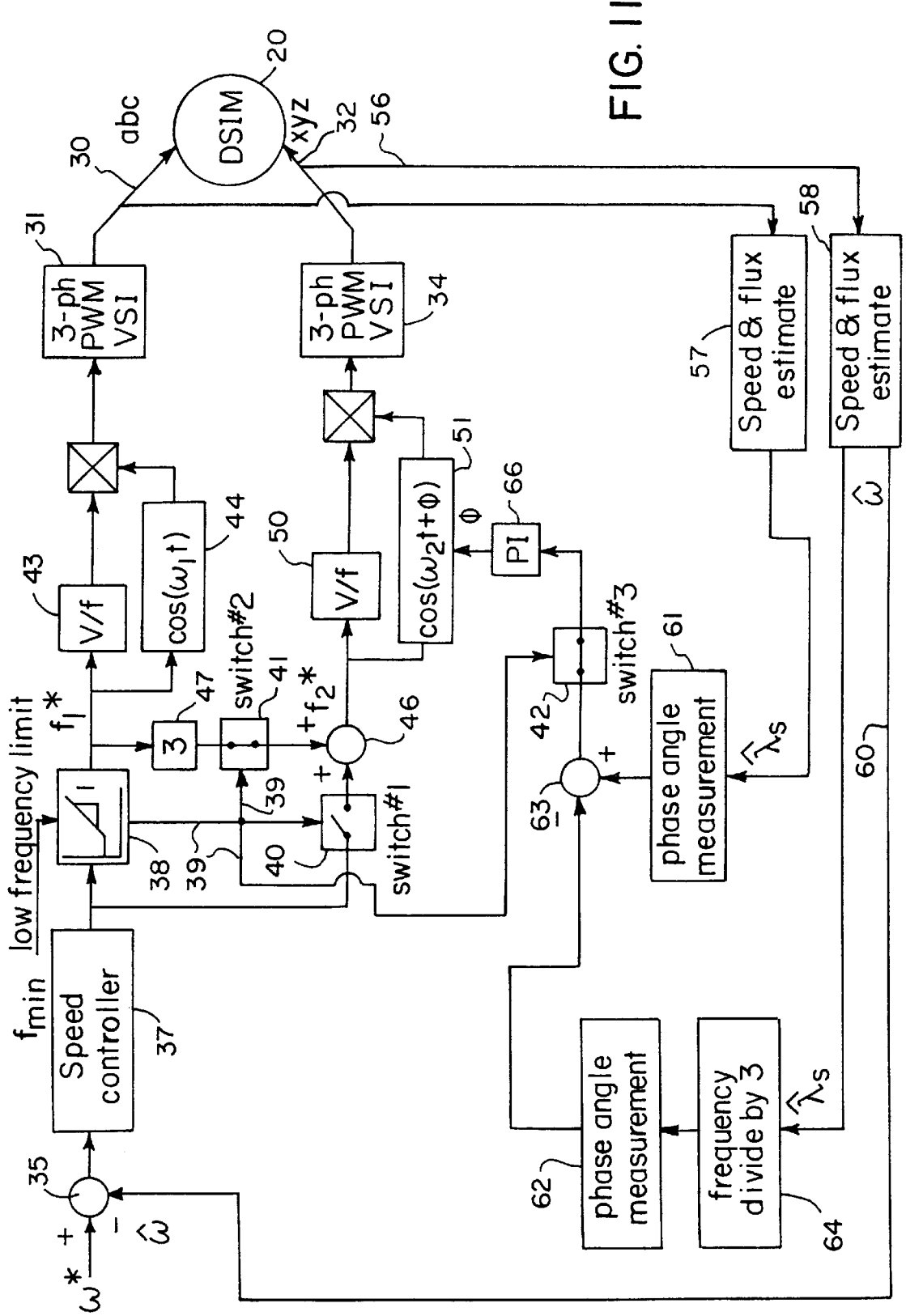
FIG. 11 is a schematic diagram of a drive system incorporating the dual stator winding machine of the invention which implements constant V/f operation.

A simplified block diagram of the control scheme for constant V/f operation is shown in FIG. 11. As illustrated in this figure, the abc winding receives 3-phase power on input terminals 30 from a first 3-phase PWM voltage source inverter 31, while the xyz windings receive power on terminals 32 from a separate 3-phase PWM voltage source inverter 34. The commanded speed, ω*, is provided to a summing junction 35 where it is compared with the estimated speed, ω̂, and the difference is provided to a speed controller 37, e.g., a proportional-integral (PI) controller. The output of the speed controller is provided to a frequency limit detection circuit 38, which is provided with a selectable minimum frequency, $f_{min}$. The circuit 38 is connected by lines 39 to provide control signals to switches 40, 41, and 42. If the input frequency is greater than $f_{min}$, the output of the circuit 38 on a line 43 is the same as the input and the switches 40, 41, and 42 are in the positions shown in FIG. 11 (40 open, 41 and 42 closed). If the input frequency to the circuit 38 is less than $f_{min}$, the output frequency from the circuit is clamped at the value $f_{min}$, and the switches are activated so that the switch 40 is closed and the switches 41 and 42 are opened. The output $f_1$* of the circuit 38 is used as the reference frequency for a V/f modulation function 43 and a carrier frequency function cos$((\omega_1 t)$ 44, the outputs of which are multiplied together and applied as the input to the voltage source inverter 31 to provide the abc (e.g., two pole) winding drive power on the terminals 30. The output of the speed controller 37 is also provided to the switch 40 and thence to a summing junction 46, which also receives from a gain unit 47 through the switch 41 an input equal to 3 $f_1$*.

The output $f_2^*$ of the summing junction 46 is equal to $3f_1^*$ when the switch 41 is closed, and is equal to the output of the speed controller 37 when the switch 40 is closed and the switch 41 is opened. The signal $f_2^*$ is provided to a circuit composed of a V/f function 50 and a $\cos(\omega_2 t + \theta)$ function 51, the outputs of which are multiplied and applied to the voltage source inverter 34 to provide the xyz winding (e.g., 6 pole) drive power on the terminals 32. The power applied to the machine 20 on the input terminals 30 and 32 is fed back by lines 55 and 56 to speed and flux estimators 57 and 58, respectively. The estimator circuit 58, of conventional design, provides an estimate ώ of motor speed on a line 60 back to the summing junction 35. The estimator circuits 57 and 58 also provide signals indicative of the flux applied by the two stator windings, which signals are passed through phase angle measurement circuits 61 and 62 and added at a summing junction 63. The estimated flux of the xyz winding (6 pole) has three times the frequency of the flux from the abc winding; for this reason a frequency divider block 64 is used on the flux estimate from the estimator 58. The phase difference from the junction 63 is provided through the switch 42 to a control circuit 66 (e.g., PI), the output of which is provided as a phase difference ø to the circuit 51.

Figure 12:
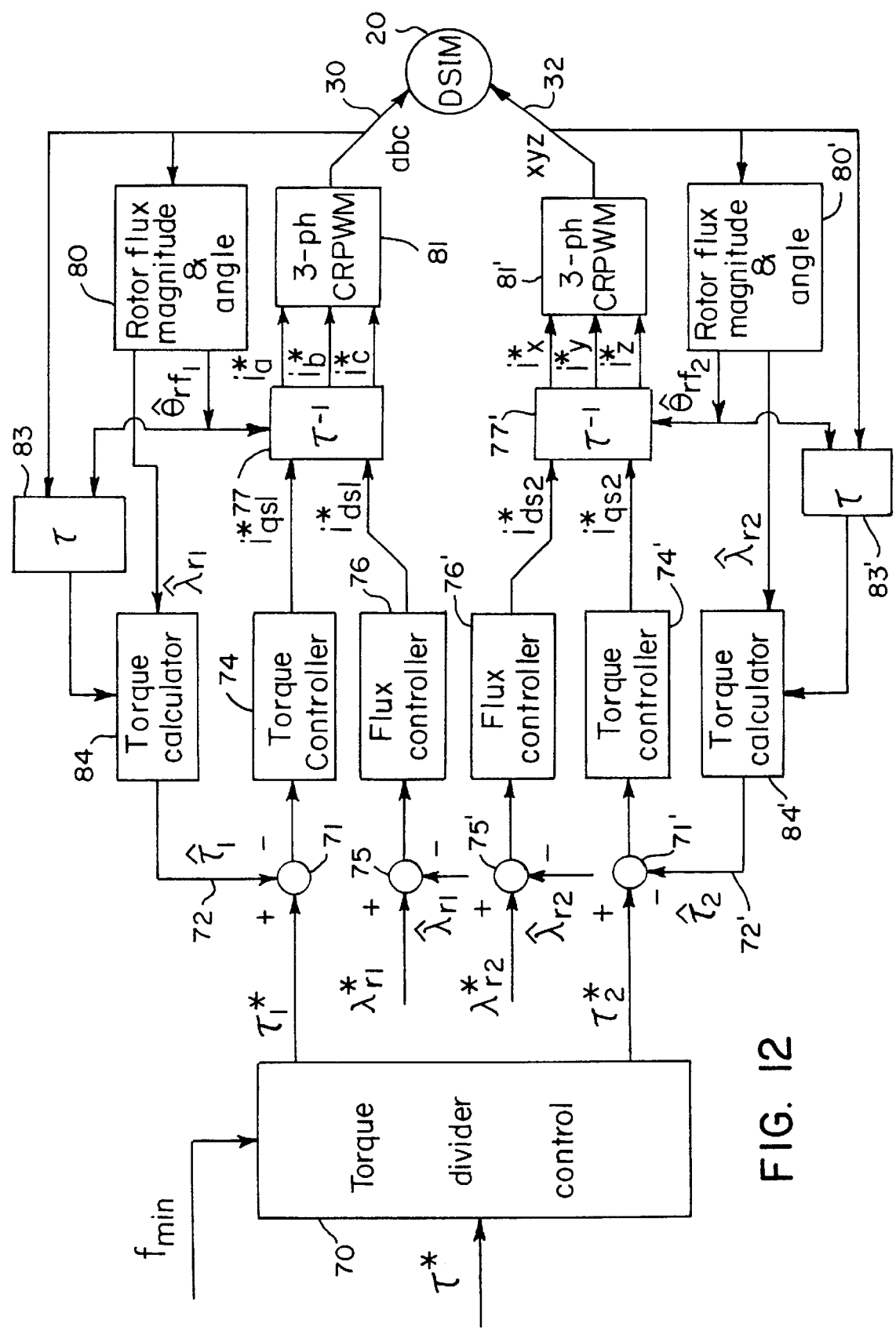
FIG. 12 is a schematic diagram of a drive system incorporating the dual stator winding machine of the invention which implements field oriented operation.

A simplified block diagram of a vector controller is given in FIG. 12. As in the constant V/f method, the vector control operation is divided into two operating regions: a high speed range defined by frequencies above a minimum frequency $f_{min}$ and a low speed range for frequencies below $f_{min}$. For the high speed region, the controller divides the output torque among the two windings to yield similar stator currents and a nearly trapezoidal flux distribution. In the low speed range, a negative torque command is given to the secondary (e.g., xyz) winding, hence increasing the torque produced by the primary winding which yields an increased stator frequency. The goal is to maintain the primary stator frequency at a constant value equal to $f_{min}$. The torque command input T* and the minimum frequency $f_{min}$. are provided to a torque divider control circuit 70, which provides output command signals for the two windings $T_1^*$ and $T_2^*$, for the abc and xyz windings, respectively. The torque command $T_1^*$ is provided to a summing junction 71, which also receives a torque feedback estimate $\hat{T}_1$ on line 72, and the difference is provided to a torque controller 74. A flux command signal and a flux feedback signal are provided to a summing junction 75, the output of which is provided to a flux controller 76. The outputs of the flux controller 76 and torque controller 74 are supplied to a transformation circuit 77, which also receives a signal that is an estimate of the rotor flux angle from an estimater circuit 80. The ransformation circuit 77 provides current command signals to a current controlled hree-phase PWM inverter 81, which provides output power on the lines 30 to the bc winding. The power signals on the lines 30 are also supplied to a torque ontroller feedback circuit 83, the output of which is provided to a torque calculator 84 to provide the torque estimate on the line 72. Similar components, designated by similar numerals with a prime notation, "'", are utilized in the control circuit to rovide the drive power on lines 32 to the xyz winding.

The torque divider used in the control loop for the field oriented control strategy of FIG. 12 works as follows: given the external torque command and the limit frequency $f_{min}$ it adjusts the torque commands $T_1^*$ and $T_2^*$ such that the two supplied frequencies are in the ratio 1:3 and the lowest frequency (2-pole winding) is above $f_{min}$. If the required frequency is less than the minimum value, the commanded frequency to the 2-pole winding is fixed at the value $f_{min}$ and the torque command $T_2^*$ is adjusted such that the resulting torque corresponds to the externally commanded torque.

Figure 13:
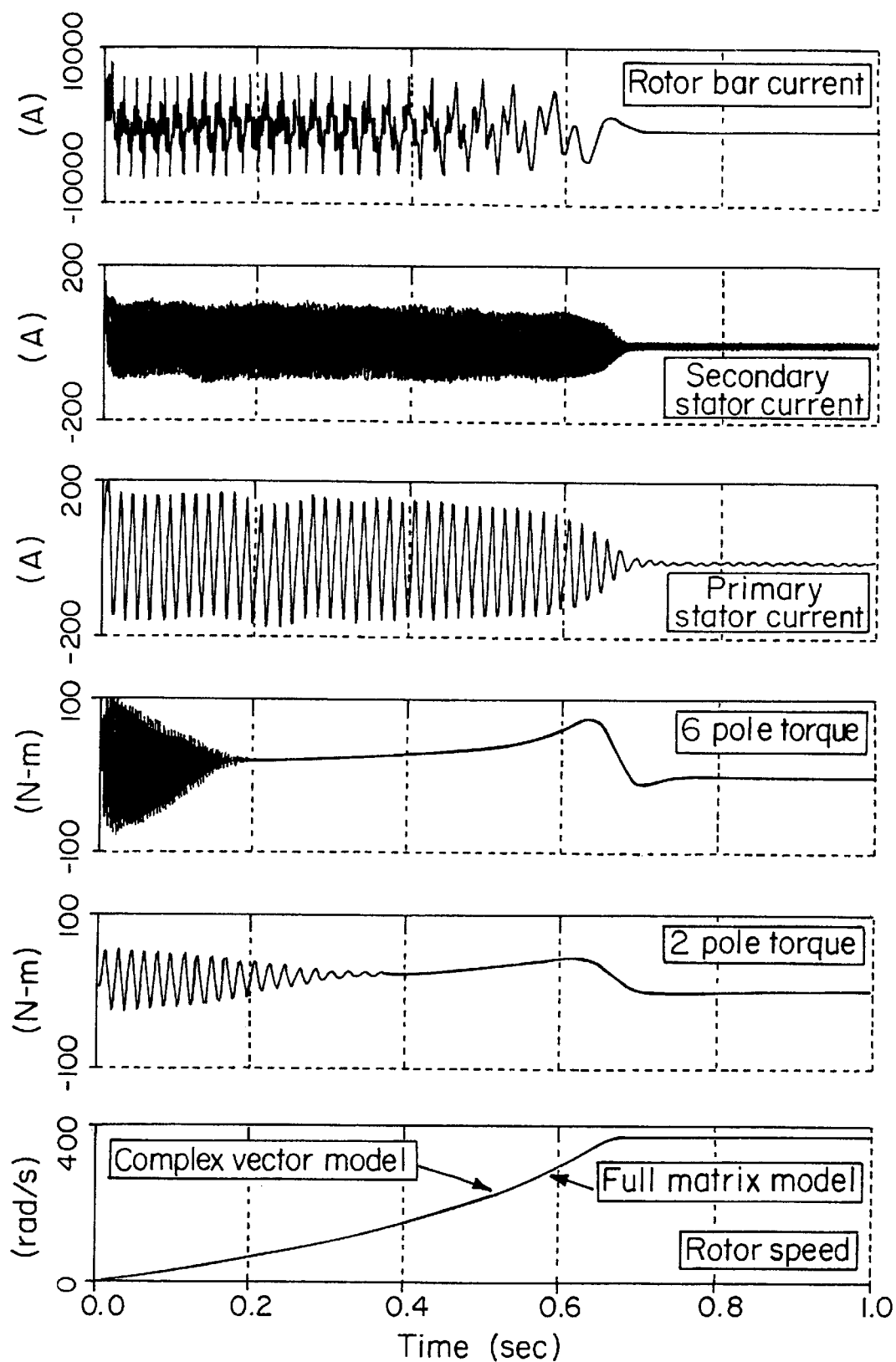
FIG. 13 are graphs illustrating full matrix and complex vector model simulation results for the 2 pole/6 pole dual stator winding machine of the invention.

The results obtained from a space vector model of the machine 20 and those obtained from a full matrix model of the machine are shown in FIG. 13 for a free acceleration run at 60 Hz ($f_2$=180 Hz). The complex vector and full matrix model traces are superimposed. Both simulations provide essentially identical results, demonstrating the validity of the complex vector model. As shown in FIG. 13, the rotor currents contain two different frequencies dictated by the frequency of each of the stator currents and the rotor mechanical speed. Although the rotor currents simultaneously produce two field distributions that rotate at different speeds, because of the different number of poles and the sinusoidal characteristic of the stator windings, they do not give rise to harmonic torques.

Figure 14:
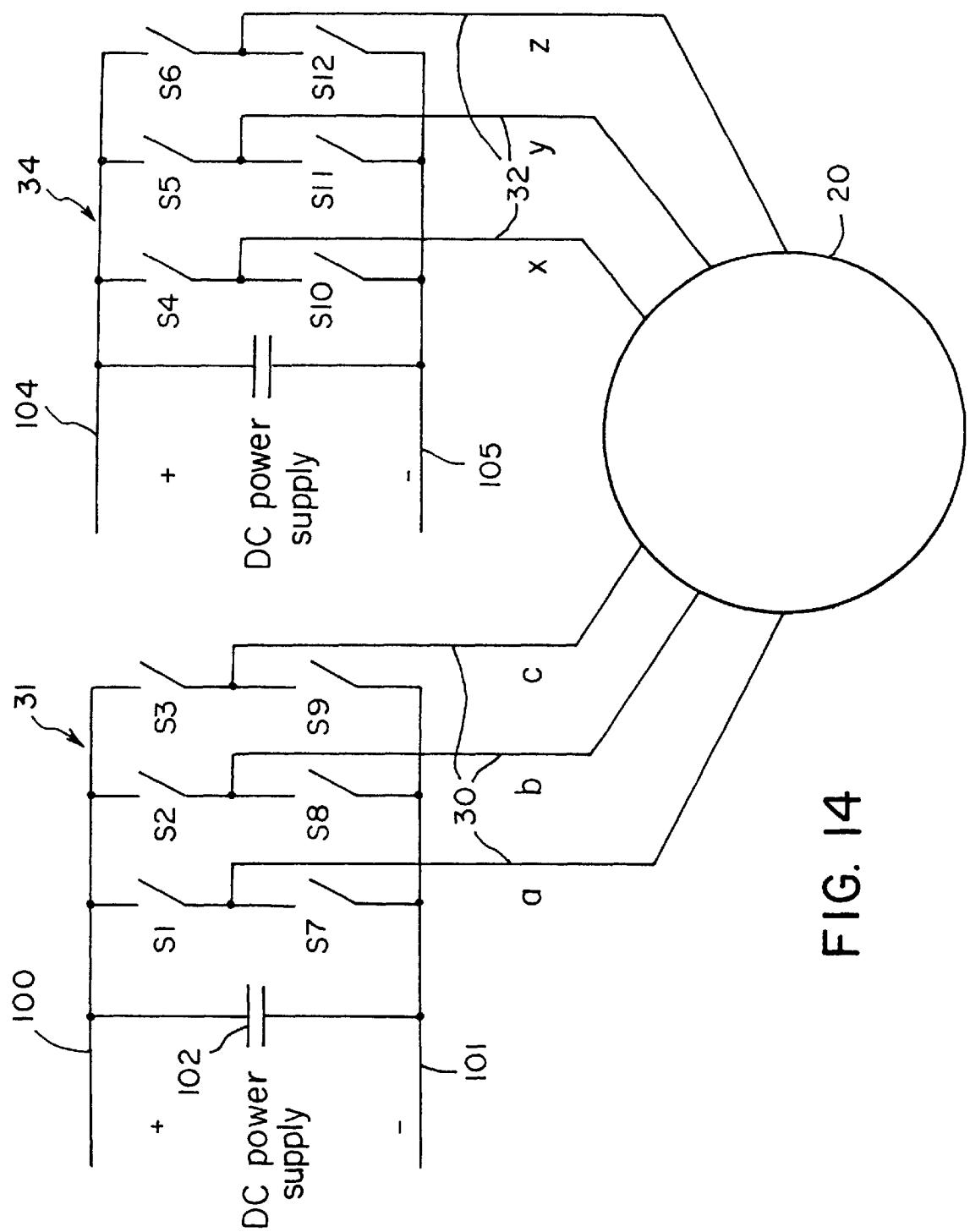
FIG. 14 is a schematic diagram illustrating the use of two separate inverters for driving a dual stator winding induction motor in accordance with the invention.
Figure 15:
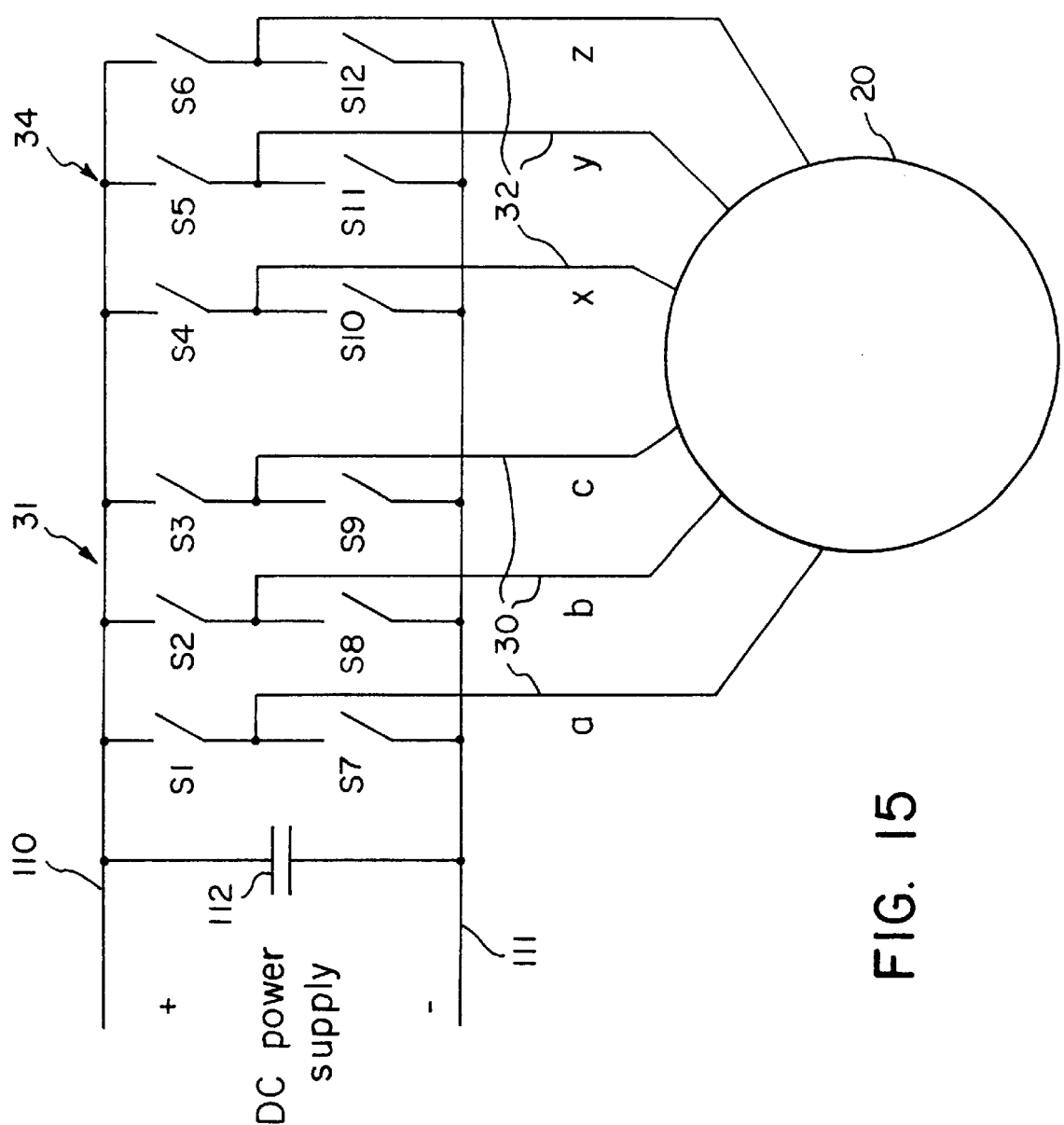
FIG. 15 is a schematic diagram illustrating an inverter having separate sections for driving a dual stator winding induction motor in accordance with the invention.

The present invention may be implemented utilizing two separate inverters 31 and 34 for providing the drive power to the two windings of the induction motor 20, as illustrated in FIG. 14. The first inverter 31, providing drive power to the input lines 30 of the abc winding, receives power across DC bus lines 100 and 101, with an illustrative DC bus capacitor shown at 102. Semiconductor switches S1 S3 and S7–S9 are appropriately controlled to provide the desired drive power to the dual stator induction motor. The second inverter 34 receives drive power from separate DC bus lines 104 and 105 with a DC bus capacitor illustratively shown at 106. Semiconductor switches S4–S6 and S10–S12 are operated to provide the power to the xyz windings on the input lines 32. Although not necessary in accordance with the invention, it is convenient to utilize inverters of the so-called current regulated pulse width modulated type (CRPWM). Alternatively, as shown in FIG. 15, the inverters 31 and 34 can be implemented utilizing a single set of DC bus lines 110 and 111 with a DC bus capacitor illustratively shown at 112. Switches S1–S3 and S7–S9 are operated across the DC bus lines 110 and 111 to provide the drive power to the input lines 30, while switches S4–S6 and S10–S12 are operated to provide drive power on the input lines 32 to the xyz windings. The two inverter sections 31 and 34 can thus be operated independently of each other even though utilizing the same DC bus lines.

Figure 16:
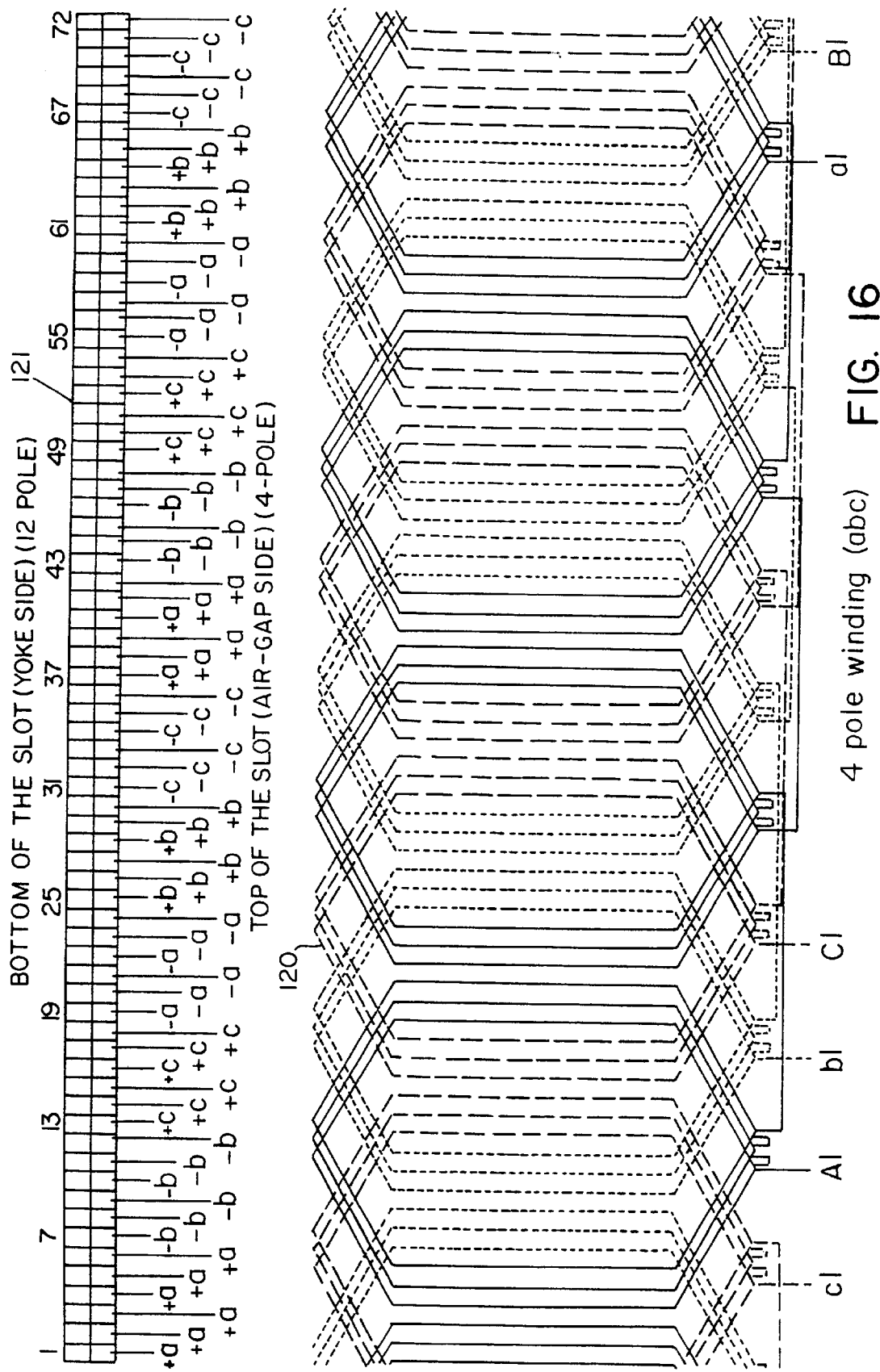
FIG. 16 are diagrams illustrating the winding distribution for a 4 pole winding in a dual stator Winding induction motor in accordance with the invention.
Figure 17:
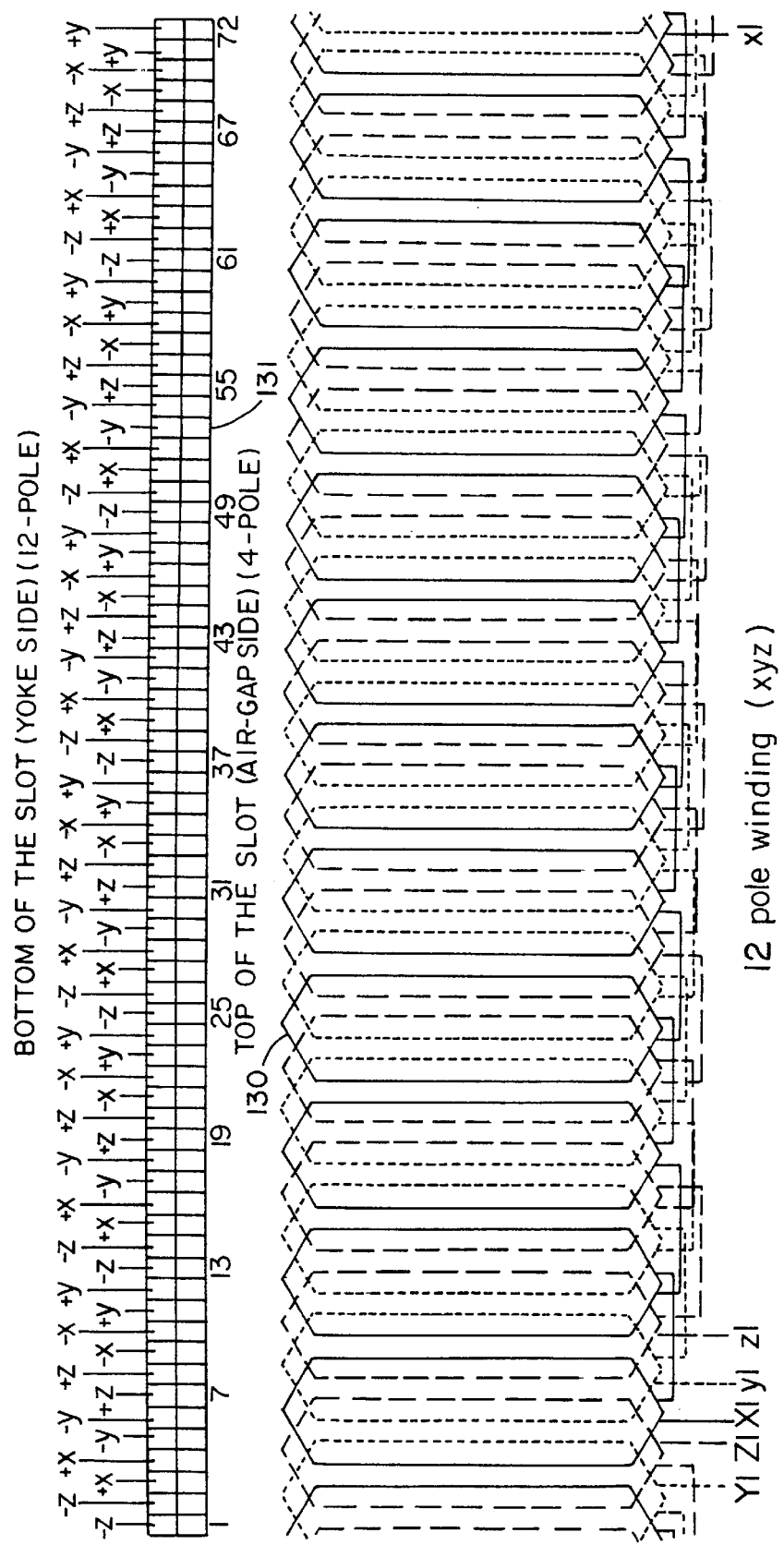
FIG. 17 is a diagram illustrating the winding distribution for a 12-pole winding of a dual stator winding motor in accordance with the invention.

The present invention may be implemented utilizing winding combinations other than 2-pole to 6-pole, for example, 4-pole to 12-pole and higher. FIG. 16 illustrates at 120 the 4-pole winding distribution for a 4-pole to 12-pole machine, and in the top diagram labeled 121 the corresponding distribution of the abc windings in the top of the slots (air-gap side). FIG. 17 illustrates the 12-pole winding distribution at 130, and the diagram 131 illustrates the distribution of the xyz windings in the bottom of the slot (yoke side) of the machine.

It is understood that the invention is not confined to the particular embodiments set forth herein as illustrative, but embraces all such forms thereof as come within the scope of the following claims.

What is claimed is:

1. A motor drive system comprising:
    (a) a polyphase induction motor comprising a stator having two separate stator windings with separate input terminals for each winding by which drive power may be applied separately to the two windings, wherein the two windings have a different number of poles that are in the ratio 1:3, and a squirrel cage rotor mounted within the stator;
    (b) a first power inverter connected to the input terminals of a first of the stator windings that has the lower number of poles, the first power inverter providing output power at a selectable frequency; and (c) a second power inverter connected to the input terminals of a second of the stator windings that has the higher number of poles, the second power inverter providing output power at a frequency which can be selected separately from the frequency of the output power provided by the first power inverter.

2. The motor drive system of claim 1 wherein one of the stator windings has 2 poles and the other stator winding has 6 poles.

3. The motor drive system of claim 1 wherein one of the stator windings has 4 poles and the other stator winding has 12 poles.

4. The motor drive system of claim 1 wherein the frequency of the drive power from the second inverter is three times the frequency of the drive power from the first inverter.

5. The motor drive system of claim 1 further including control means connected to the first and second inverters to provide control signals thereto to control the inverters for constant volts per hertz operation.

6. The motor drive system of claim 5 wherein the control means operates in a first mode at a low speed of the motor below a selected minimum speed and in a second mode above the selected minimum speed, wherein the control means in the first mode controls the second inverter to provide drive power to the second winding that applies torque that opposes the torque applied by the first winding driven by power from the first inverter under the control of the control means, and in the second mode the control means controls both inverters to apply power to the first and second windings to apply torque in the same direction.

7. The motor drive system of claim 6 wherein in the second mode the control means controls the inverters such that the second inverter provides power at three times the frequency of the power provided by the first inverter.

8. The motor drive system of claim 1 including control means connected to the first and second inverters for controlling the inverters in field oriented operation.

9. A method of controlling a polyphase induction motor having two separate stator windings which have a different number of poles and a squirrel cage rotor within the stator, comprising the steps of:

(a) applying power at a first frequency to a first one of the windings that has the fewer number of poles; and (b) separately applying power at a second frequency to the second one of the windings that has the higher number of poles.

10. The method of claim 9 wherein in the step of applying power to the second winding the power is applied at a frequency such that the torque applied by the second winding opposes the torque applied by the first winding.

11. The method of claim 9 wherein in the step of applying power to the second winding the power is applied so that the torque applied by the second winding adds to the torque applied by the first winding.

12. The method of claim 11 wherein the second winding has three times the number of poles as the first winding, and the frequency of the power applied to the second winding is three times the frequency of the power applied to the first winding.

* * * * *

UNITED STATES PATENT AND TRADEMARK OFFICE
CERTIFICATE OF CORRECTION

PATENT NO. : 6,242,884 B1
DATED : June 5, 2001
INVENTOR(S) : Thomas A. Lipo; Alfredo Rodolfo Munoz-Garcia It is certified that error appears in the above-identified patent and that said Letters Patent is hereby corrected as shown below:

Column 1,
Line 44, delete "Sahnon" and insert in its place -- Salmon --.

Column 5,
Line 26, delete "is abc" and insert in its place -- $i_{sabc}$ --.
Line 26, delete "is xyz" " and insert in its place -- $i_{sxyz}$ --.

Column 8,
Line 5, delete "simplfying" and insert in its place -- simplifying --.

Column 9,
Line 27, delete "defmed and insert in its place -- defined --.
Line 50, delete "ransformation" and insert in its place -- transformation --.
Line 51, delete "hree-phase" and insert in its place -- three-phase --.
Line 52, delete "bc" and insert in its place -- abc --.
Line 54, delete "ontroller" and insert in its place -- controller --.
Line 58, delete "rovide" and insert in its place -- provide --.

Column 10,
Line 23, insert a hyphen between "S1" and "S3" to look like S1-S3 --.

Signed and Sealed this

Thirteenth Day of November, 2001

*Attest:*

*Attesting Officer*

NICHOLAS P. GODICI
*Acting Director of the United States Patent and Trademark Office*